Oct. 18, 1927.
M. J. CLARKE
1,645,985
SAFETY COCK FOR GAS APPLIANCES
Filed July 7, 1926
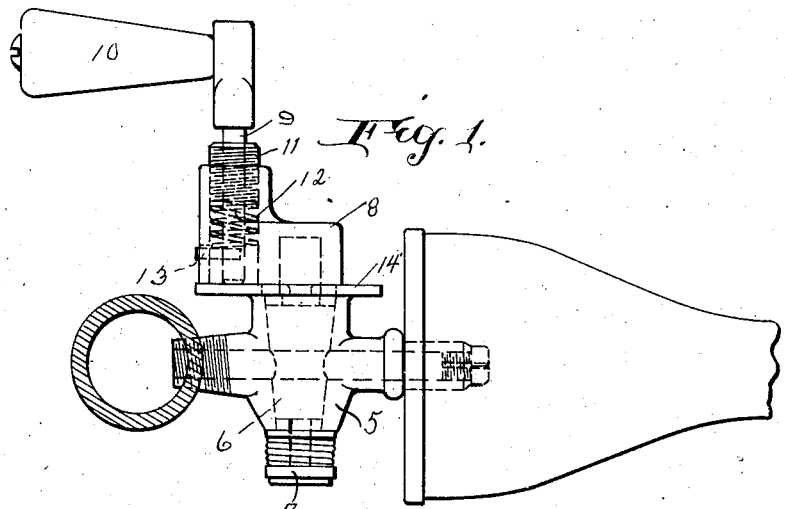
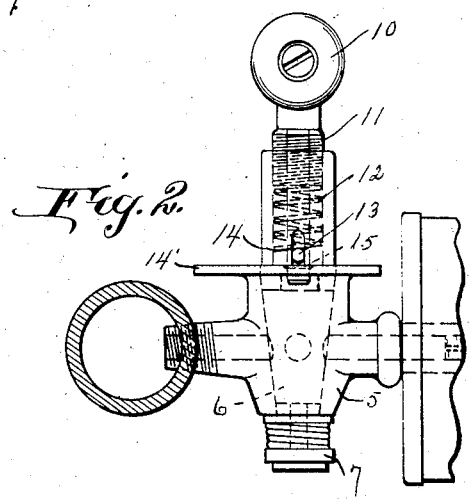
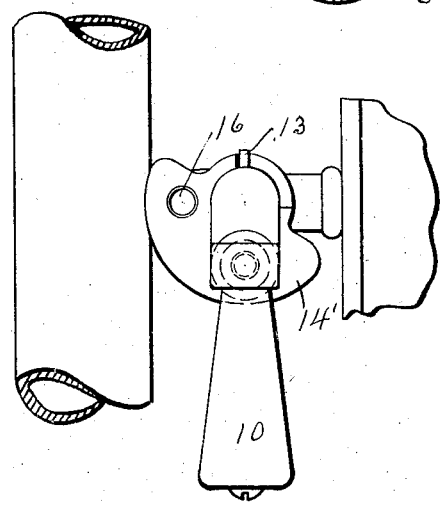
INVENTOR
Michael J. Clarke
BY
ATTORNEY Patented Oct. 18, 1927.

1,645,985

UNITED STATES PATENT OFFICE.

MICHAEL J. CLARKE, OF BALTIMORE, MARYLAND.

SAFETY COCK FOR GAS APPLIANCES.

Application filed July 7, 1926. Serial No. 120,916.

This invention relates to certain new and useful improvements in controlling valves or cocks for gas appliances, and has for its particular object the provision of a safety means for said gas cock or valve, whereby the latter may be easily locked in closed or cut off position.

A further object of the invention is the provision of a locking means for a control cock or valve, whereby the same may be held in locked closed position against accidental opening by striking the operating handle or otherwise.

A further object of the invention is the provision of a safety device for the controlling cock or valve of gas appliances, embodying a shelf or ledge formed on the body of the valve and a spring pressed handle engaging an opening formed in said ledge, whereby said valve can be held in closed position against accidental displacement.

A further object of the invention is the provision of means whereby the cock or valve may be held locked in either open or closed position.

With these and other objects in view, the invention consists in certain novel features, combination and arrangement of parts as will be hereinafter more fully described, pointed out in the drawing, and claimed.

In the drawing,

Figure 1 is a side elevational view of my improved safety cock or valve, as made in accordance with this invention and illustrating the same connected with a supply pipe and gas burner, and showing the valve in open position;

Figure 2 is a side elevational view of my improved valve in closed, locked position; and Figure 3 is a top plan view of a slightly modified form of my improved safety cock or valve.

Like numerals or references designate corresponding parts throughout the several figures of the drawing.

Referring to the drawing, the numeral 5 indicates a valve body of the well known construction commonly used for gas ranges and other gas appliances, and this valve body is provided with the usual valve controlling member 6, which member opens and closes the passage in the valve body 5. The controlling member 6 is secured in the valve body 5 by the usual locking means 7, at the lower end thereof.

To the upper end of the controlling member 6, I secure an operating member 8, which is preferably made substantially L-shaped and has its horizontal portion secured to the upper end of the controlling member 6 and its vertical portion is hollow to receive the stem 9 of the operating handle 10 therein. The stem 9 is held in the vertical portion of the operating member by a plug 11, which plug retains a coil spring 12 about said stem and this spring is compressed by a pin 13 movable in a slot 14 formed in the vertical portion of the operating member and has its inner end secured in the stem 9.

This pin forms an abutment or stop for the lower end of the spring while its upper end engages the inner end of the plug 11.

A ledge or shelf 14 is formed on the valve body 5 at its upper open end and extends laterally therefrom in a horizontal plane, and this ledge is provided adjacent one end with an opening 15 to receive said stem 9, when the controlling member is turned by the handle 10 and operating member 8 to closed position, and by virtue of the engagement of the stem 9 with this opening 15, it will positively eliminate accidental opening of the valve, thereby eliminating any danger of escaping gas.

To open the valve 6, it will be necessary to lift upwardly on the handle 10, removing the stem from the opening 15, turning the valve 6 through the medium of the member 8 until a communication is established through the valve body and controlling member 6.

In the modification, illustrated in Figure 3, the ledge 14' is identical in construction with that shown in Figures 1 and 2, with the exception that I have provided this ledge with an additional opening 16, at the end remote from the end carrying the opening 15, and this additional opening is provided for the express purpose of permitting the valve controlling member 6 to be locked in both open and closed position. The construction of the modification is identical with the preferred form, with the addition of the extra opening 16.

The operation of the device is obvious from inspection but to clarify any doubt that might exist, to operate the device it is only necessary when the valve is in closed position, as shown in Figure 2, to grasp handle 10, lift upwardly and turn. This establishes a communication between the valve body 5 and controlling member 6. To shut the valve off it is only necessary to turn the same by the handle 10 until its stem drops in opening 15.

It is also to be understood that applicant does not limit his invention to any particular structure or type of dust cap, and that certain minor features and changes may be resorted to without departing from the spirit and scope of the invention as claimed.

Having thus described my invention, what I claim as new is:

The combination with a valve having a body, a controlling member for said body, an aperture ledge formed on said body, an L-shaped operating member secured to said controlling member and movable over said ledge, a handle secured to said L-shaped member, a spring surrounding said handle and located in said L-shaped member, said spring normally urging said handle downwardly into one of the apertures of the ledge to hold said controlling member against accidental rotation.

In testimony whereof he hereunto affixes his signature.

MICHAEL J. CLARKE.